United States Patent [19]
Isbister

[11] Patent Number: 5,967,004
[45] Date of Patent: Oct. 19, 1999

[54] ANGULAR DRIVE ADAPTER FOR SOCKETS AND THE LIKE

[76] Inventor: Stanley F. Isbister, #6 McKay Pl., Saskatoon, Canada, SK S7L 3Z7

[21] Appl. No.: 09/032,793

[22] Filed: Mar. 2, 1998

[51] Int. Cl.$^6$ ...................................................... B25B 23/16
[52] U.S. Cl. ........................ 81/177.2; 81/177.7; 81/177.1
[58] Field of Search ............................ 81/177.1, 177.85, 81/177.2, 177.6, 177.7, 177.75, 177.8

*Primary Examiner*—D. S. Meislin
*Attorney, Agent, or Firm*—Jones, Tullar & Cooper, P.C.

[57] ABSTRACT

An adapter for use with a drive tool such as a ratchet will enable a user to reach a fastener that is otherwise difficult to reach. The adapter includes a first drive member having a recess in a distal end for connection to the drive tool and, in the proximal end, a center axial blind bore and a plurality of equally spaced blind bores radially spaced from the center bore. A second drive member also has a means for connecting it at the distal end thereof to a socket or to a screwdriver bit. At its proximal end the second drive member has a center axial blind bore and a plurality of equally spaced blind bores radially spaced from the center bore. The drive members are connected together by a first bar having equal length cylindrical legs angled relative to each other, with each leg being rotatably received in a corresponding center bore. A plurality of second bars, each having equal length cylindrical legs angled relative to each other, span the distance between the drive members, with the legs being slidably and rotatably received within corresponding radial blind bores of the drive members. As one drive member rotates on its axis the second bars cause the other drive member to rotate on its axis so as to impart rotation to the fastener being driven thereby.

9 Claims, 3 Drawing Sheets

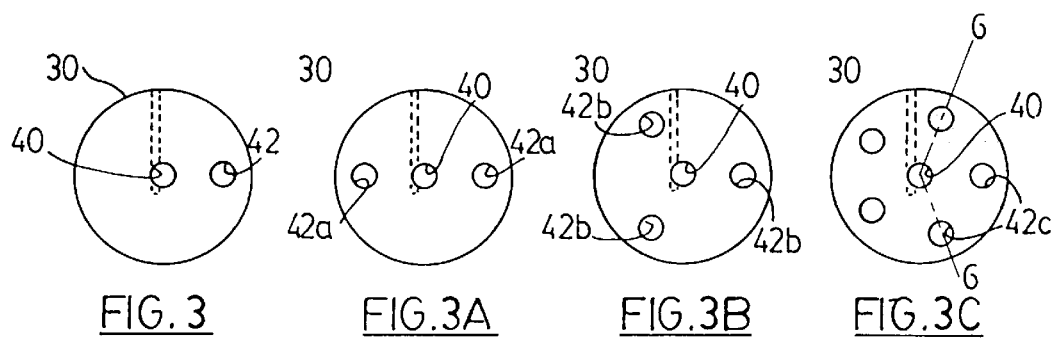
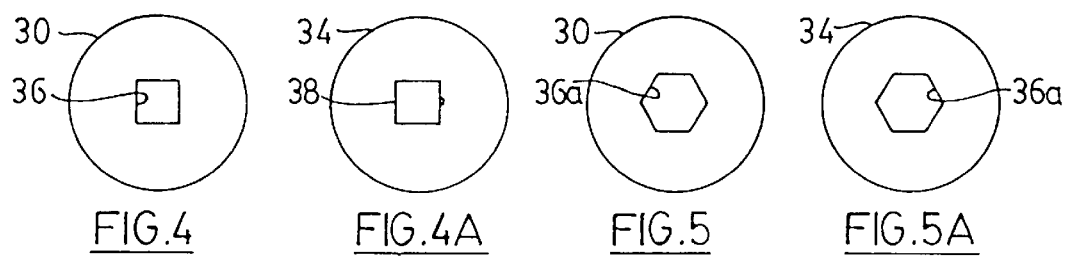
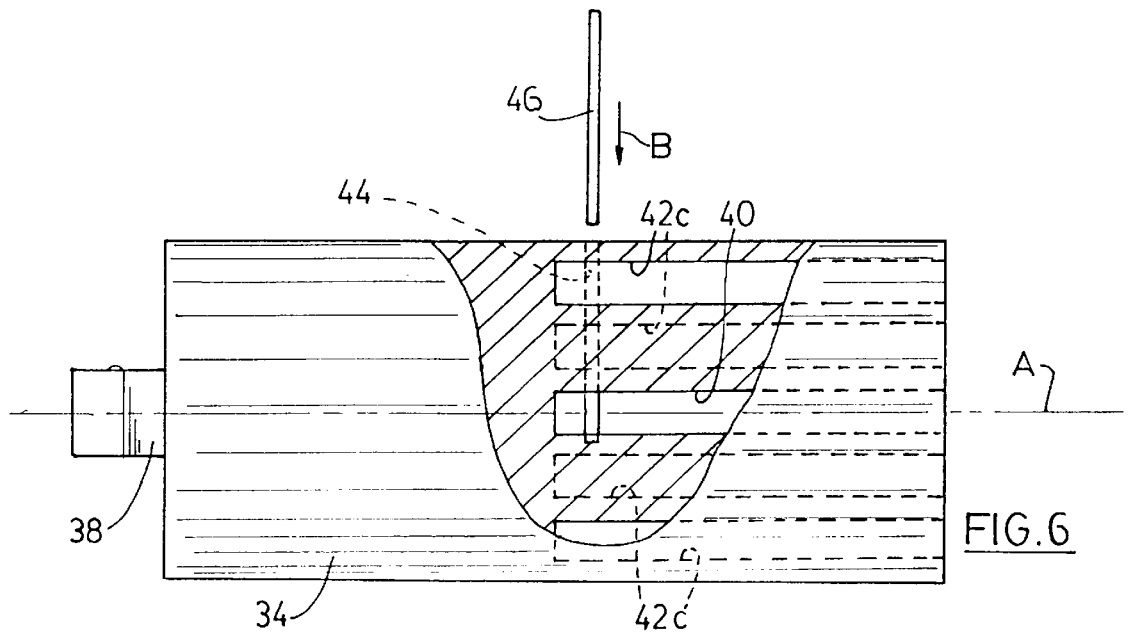

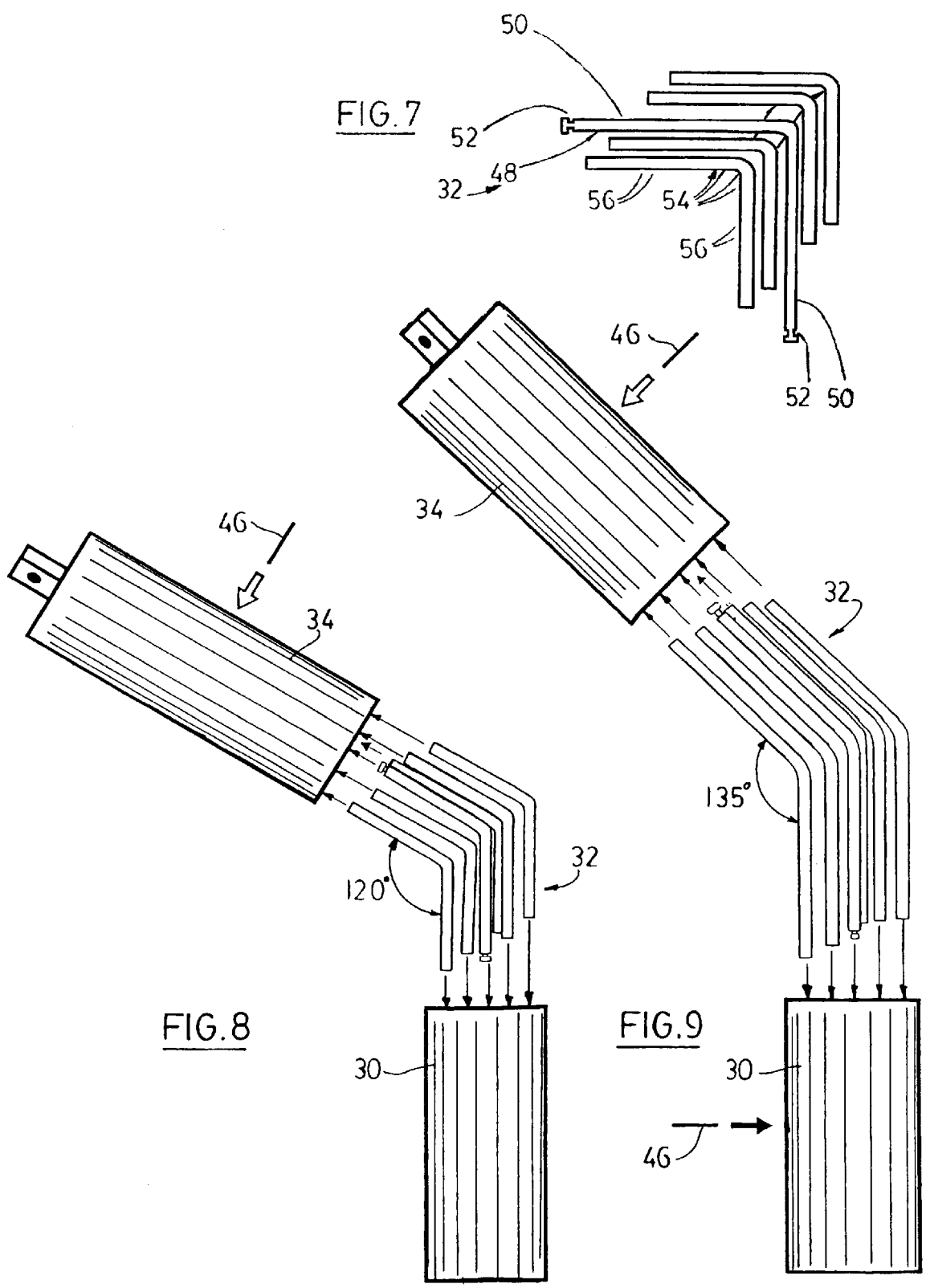

ANGULAR DRIVE ADAPTER FOR SOCKETS AND THE LIKE

The present invention relates in general to drive means for sockets and the like and in particular to a new drive system for driving sockets and the like at an angle to the drive tool.

BACKGROUND TO THE INVENTION

Sockets are typically driven or controlled by a tool which imparts rotation to the socket so that it can turn a nut or the head of a screw or bolt. The tool may be a torque wrench, or a ratchet, or a straight bar tool. Usually the torque wrench or ratchet drives the socket at a 90° angle relative to the tool itself. A straight bar tool may have the drive connection to the socket at 90° to the tool or the drive portion of the tool may be included in a universal joint connection at one end of the tool. Tools which connect directly to the socket, either by a direct connection or by a universal joint connection, are fine for driving sockets when there is unimpeded access to the nut or bolt, for example, that is to be turned thereby. However, when access to the nut or bolt, for example, is awkward or is impeded by intervening material it becomes necessary to use an extension between the tool and the socket itself, with the extension bridging the gap between the tool and the socket.

Extensions for driving sockets at a distance from the tool can take several forms. The extension can be straight, with a square drive pin at one end and a square recess at the other end. The recess would engage the drive pin of the tool while the drive pin of the socket would accept the socket for driving purposes. The extension could also be one in which there are two components connected together by a universal joint such that the extension would be able to accommodate various angles between the drive portion and the driven portion thereof. Unfortunately, angular extensions or adapters using a universal joint have difficulty in imparting adequate torque through angles greater than 45°, as they tend to bind. There is therefore a need for a better extension or adapter which will permit the use of sockets or other tools at angles greater than 45°.

SUMMARY OF THE INVENTION

The present invention provides a solution to the problem of angled drives for sockets and the like by utilizing a pair of drive members, each of which has an axis of rotation. One of the members is adapted for driven connection to a drive tool, such as a ratchet or a torque wrench, while the other of the members is adapted for driving connection to a socket or the like. Each of the drive members has a series of blind bores extending inwardly from one end thereof, the bores being parallel to the axis of rotation. The blind bores include one which is coincident with the axis of rotation and at least one which is radially spaced from the centre bore. Preferably there are at least three bores spaced from the centre bore and equally spaced apart therearound. The optimum number of such bores is believed to be five.

The two drive members are interconnected together by first and second elongated bars, each of which has a pair of equal length cylindrical legs which meet at the desired angle, such as 90°. The first bar has its legs rotatably receivable within corresponding axially aligned blind bores of the drive members, there being means associated with the legs of the bar and each drive member to prevent the legs from sliding outwardly of the blind bores. Each of the second bars is associated with a corresponding pair of radially positioned blind bores in the drive members. Each leg of the second bars is both slidably and rotatably receivable within the corresponding radially positioned blind bore of the drive members.

In operation, one of the drive members will be connected to a drive tool for rotation thereby while the other drive member carries a socket which is engaged with the head of a bolt, for example. As the one drive member rotates on its axis it will force the second bar or bars to rotate about the axis of rotation. As rotation continues, the second bars will also impart rotational movement to the other drive member due to the sliding and rotating movement of the second bar or bars relative to the two drive members. The two drive members are constrained by the first bars and hence there will be a one-to-one rotation of the other drive member relative to the one drive member as the other drive member follows the one drive member.

The present invention allows one to effectively transmit rotation along one line or axis to a member which is located on another line or axis, thereby permitting one to drive a fastener, such as a bolt or nut, which would not normally be available due to impeding structure. The angle between the legs of the first and second bars could be selected to be anywhere between 90° and 180°, the only constraint being that the angle must be the same for all of the bars. The extension or adapter of this invention could be used in conjunction with other extensions connected to one or the other or both of the drive members.

Broadly speaking, therefore, the present invention may be considered as providing an angular drive for sockets and the like comprising: first and second drive members, each drive member having a rotational axis, a first blind bore in one end centered on the rotational axis, at least one second blind bore in the one end displaced radially from the first blind bore, and drive means centered on the rotational axis at the other end engageable with one of a driving tool or a driven tool; first bar means having equal length cylindrical legs angled relative to each other with the legs being rotatably receivable in corresponding first blind bores of the drive members; means engageable with each of the legs and the corresponding drive member to retain each such leg within its blind bore; and second bar means having equal length cylindrical legs angled relative to each other with the legs thereof being slidably and rotatably receivable in the corresponding at least one second blind bore of the drive members, the legs of the second bar means being angled at the same angle as the legs of the first bar means.

BRIEF DESCRIPTION OF THE DRAWINGS

FIGS. 3, 3A, 3B and 3C are end views showing the position of the blind bores for different configurations of the present invention.

FIGS. 4, 4A, 5 and 5A are end views showing the means for connecting the drive members to drive tools and driven elements.

FIG. 6 is an enlarged partial cross-sectional view on the line 6—6 of FIG. 3C showing the blind bores and the interlocking means.

FIG. 7 shows the bars used to interconnect the two drive members together.

FIGS. 8 and 9 are views similar to FIG. 2 showing two other angular orientations for the present invention.

DESCRIPTION OF THE PREFERRED EMBODIMENT

Figure 1:
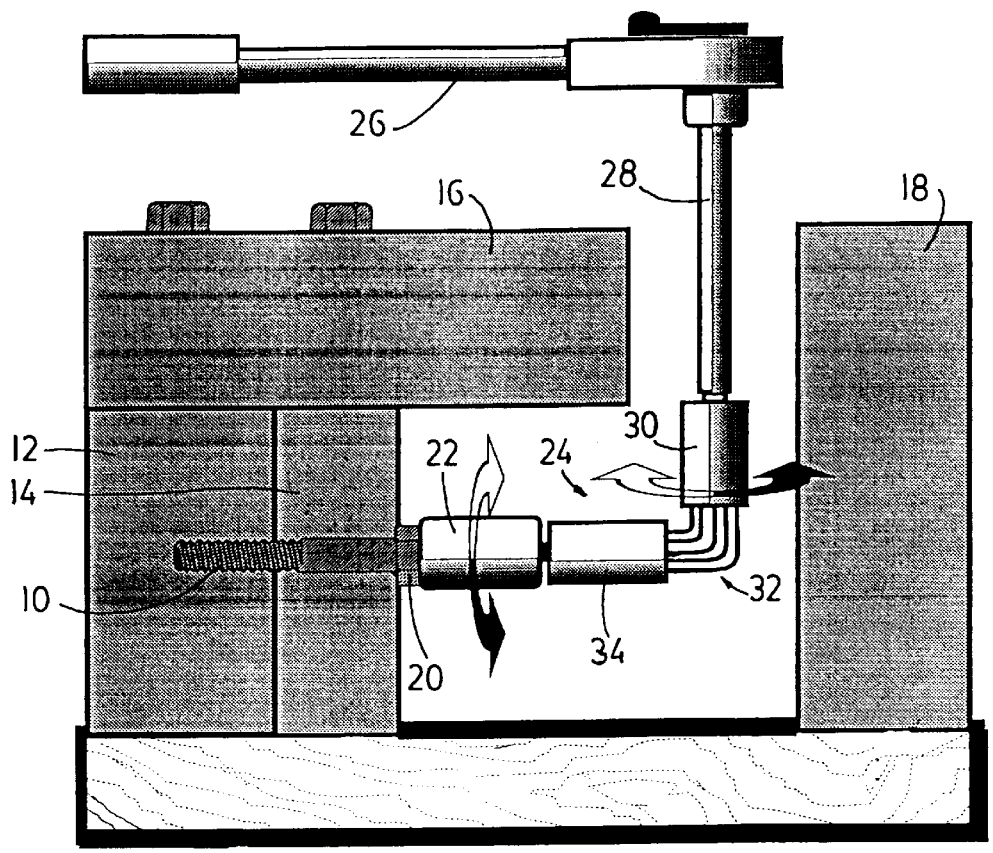
FIG. 1 shows the present invention in use.

FIG. 1 of the drawings illustrates a typical situation calling for an angle drive adapter such as is provided by the present invention. In this figure a lag bolt 10 connects two pieces of wood 12 and 14 together and another piece of wood 16 overlies the pieces 12 and 14. Yet another piece of wood 18 blocks easy access to the head 20 of the bolt 10 so that it becomes very difficult to remove the bolt 10 using a conventional socket combination. In this case, a socket 22 can be driven by a right angle drive adapter 24 of the present invention, which adapter in turn is driven by a ratchet 26 connected to the adapter by way of a conventional straight extension 28. As the ratchet is rotated into or out of the plane of the paper it will impart rotation to the extension 28 which in turn imparts rotation to the first drive member 30 of the adapter 24. The drive member 30 imparts rotation via the interconnecting bars 32 to the second drive member 34 and thereby to the socket 22 which turns the bolt 10. By using the adapter of the present invention it is possible to insert or remove fasteners such as bolts or screws in areas that are not normally accessible to conventional tools.

Figure 2:
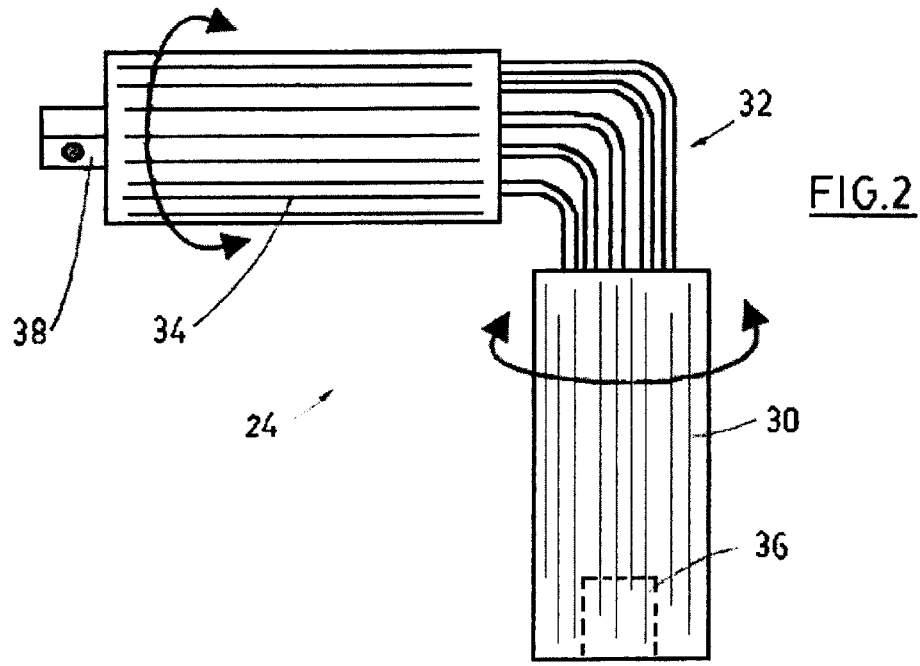
FIG. 2 is an elevational view of the angle drive adapter of the present invention.

FIGS. 2 to 7 illustrate the adapter 24 of the present invention in greater detail. FIGS. 2 and 4 show the first drive member 30 as being a generally cylindrical block having a generally square recess 36 in the distal end thereof. That recess is sized for reception of the drive pin of a conventional ratchet 26 or extension 28. FIGS. 2 and 4A show the second drive member 34 as also being a generally cylindrical block having a square drive pin 38 projecting from the distal end thereof, the drive pin 38 being sized for engagement with the drive recess of a conventional socket. FIGS. 5 and 5A show that the recess 36a could be hexagonal rather than square and that the drive member 34 could also have a matching hexagonal recess 36a therein rather than a square drive pin thereon. In this configuration the first drive member could be driven by a tool having a hexagonal cross-section and the second drive member could accommodate a tool such as a screwdriver bit, which usually is hexagonal in cross-section, for driving screws rather than bolts or nuts.

FIG. 3 shows the proximal end of the drive member 30 wherein it is seen that there is a first blind bore 40 centered on the rotational axis A (FIG. 6) of the member. Radially spaced from the bore 40 and located inwardly of the outer wall of the drive member is second blind bore 42 of essentially the same diameter as the bore 40. FIG. 3A shows two diametrically opposed second blind bores 42a in the proximal end of the drive member. FIG. 3B shows three second blind bores 42b in the proximal end of the drive member, the bores 42b being radially spaced from the central bore 40 and being spaced from each other by 120°. FIG. 3C shows the preferred embodiment of this invention wherein there are five blind bores 42c in the proximal end of the drive member with the bores 42c being radially spaced from the central bore 40 and being spaced from each other by 72°. The present invention is operable with a single blind bore 42 as shown in FIG. 3; however performance of the adapter of the invention is enhanced, due to reduced chances of binding, with increased numbers of bores 42 to the point where the optimum number of bores 42 is five, as seen in FIG. 3C.

With reference to FIG. 6 it will be seen that the bores 40 and 42, 42a, 42b, 42c extend inwardly from the proximal end of the drive member for about one half the length of the member. The drive member is also provided with a transverse bore 44 which extends generally radially inwardly from the side wall of the member and adjacent the blind end of the central bore 40. The bore 44 intercepts the central bore 40 and extends just slightly beyond the central bore. The bore 44 is adapted to receive a split or solid locking pin 46, shown in FIG. 6 as being adjacent the drive member and positioned for insertion into the bore 44 in the direction of the arrow B. When the locking pin 46 is fully inserted in the bore 44 a short portion thereof will project radially outwardly of the drive member so that it can be gripped by fingers or pliers to facilitate removal of the pin from the drive member. It is understood that the arrangement of bores shown in FIG. 6 is identical for both of the drive members 30 and 34.

FIG. 7 illustrates generally the bars 32 used to impart rotation from one drive member to the other. The set of bars 32 includes a first or central bar 48 that has a pair of equal length cylindrical legs 50 which meet at the centre of the bar at the desired angle, such as 90°. Each leg 50 is rotatably receivable in a corresponding first or centre bore 40 of the drive members 30 and 34. Each leg 50 has a circumferential groove 52 near the free end thereof, which groove can receive the locking pin 46 therein. When a locking pin 46 engages a groove 52 the leg of the bar 48 is prevented from inadvertent outward movement relative to the drive member, but there is no impediment to rotation of the drive member relative to the bar 48.

The set of bars 32 also includes one or more, depending on the number of second blind bores, second bars 54, each of which has a pair of equal length cylindrical legs 56 meeting at the centre of the bar at the same desired angle as the legs 50 of the bar 48. Each of the legs 56 is slidably and rotatably receivable in a corresponding second blind bore of the drive members 30 and 34. There are no constraints to prevent outward or inward sliding movement of a leg 56 relative to a second blind bore of a drive member.

The angular drive of the present invention could be purchased in an assembled state or it could be purchased as a kit having two sets of drive members, one for sockets and one for screwdriver inserts, and several sets of bars 32, to accommodate different angles. FIGS. 8 and 9 illustrate exploded components wherein the angle between the legs of the interconnecting bars is 120° and 135° respectively. Although not illustrated, it is clear that other angles could be accommodated merely by providing a set of bars of the desired angle. When one uses a kit having sets of bars and sets of drive members one would select the appropriate set of drive members, insert the desired first interconnecting bar 48 in the central blind bore of one drive member, lock that bar in position by inserting the locking pin 46 to engage the groove 52 in the leg 50, insert the second bar or bars in the radial bore or bores, engage the first and second bars with the respective blind bores of the other drive member, and lock the leg of the first bar in the central bore of the other drive member with the locking pin therefor. The drive adapter of the present invention is now ready for use, as shown in FIG. 1.

With an assembled adapter of the invention attached to a drive tool and to the head of a fastener, as seen in FIG. 1, the drive tool is rotated so as to impart rotation to the one drive member 30 on its axis A. As the drive member 30 rotates, each of the legs 56 of the second bars 54 will orbit about the axis A, constrained by the blind bores 42, and the drive member will rotate as well on the leg 50 of the first bar 48 housed in the centre blind bore 40. The rotational movement also causes the legs 56 to slide in their blind bores until the opposing legs 56 of the bars 54 cause the other drive member 34 to rotate on its axis about the other leg 50 of the centre bar 48. The drive members cannot move axially relative to the legs 50 of the bar 48 due to the restraint imposed by the locking pins 46 engaging with the grooves 52. As the first drive member 30 rotates with the drive tool the second drive member 34 is constrained by the first bar 48 against axial movement and it is forced to rotate on its axis by the sliding and rotating second bars 54. The following rotation of the drive member 34 is smooth and at a one-to-one ratio with respect to the leading drive member 30. With this invention one can effectively turn fasteners which are difficult to reach with conventional drives, and with a kit as described above one can reach a multitude of different fasteners by selecting the appropriate drive members, attachments and angled bars.

The foregoing has described the preferred form of the present invention, but it is expected that a skilled person in the art could alter the structure of the invention without departing from the spirit of the invention. Accordingly the scope of protection to be afforded this invention should be determined from the claims appended hereto.

I claim:

1. An angular drive adapter for sockets and the like comprising: first and second drive members, each drive member having a rotational axis, a first blind bore in one end centred on the rotational axis, at least one second blind bore in the one end displaced radially from said first blind bore, and drive means centred on the rotational axis at the other end engageable with one of a driving tool or a driven tool; first bar means having equal length cylindrical legs angled relative to each other with said legs being rotatably receivable in corresponding first blind bores of said drive members; means engageable with each of said legs and the corresponding drive member to retain each such leg within its blind bore; and second bar means having equal length cylindrical legs angled relative to each other with the legs thereof being slidably and rotatably receivable in the corresponding at least one second blind bore of said drive members, the legs of said second bar means being angled at the same angle as the legs of said first bar means.

2. The angular drive adapter of claim 1 wherein there are two diametrically opposed second blind bores in the one end of each drive member and there are two identical second bar means with the legs thereof being slidably and rotatably receivable in the corresponding second blind bores of the drive members.

3. The angular drive adapter of claim 1 where there are three or more second blind bores equally spaced about and from said first blind bore in the end of each drive member and a corresponding number of second bar means with the legs thereof being slidably and rotatably receivable in the corresponding second blind bores of the drive members.

4. The angular drive adapter of claim 1 wherein the angle between the legs of each of said bar means is equal to or greater than 90° and equal to or less than 180°.

5. The angular drive adapter of claim 4 wherein said retaining means includes a circumferential groove in each leg of said first bar means, a bore in each drive member extending radially from said first blind bore to an outer surface of the drive member, and a locking pin receivable in said radial bore, said locking pin being engageable with said circumferential groove to prevent said first bar means leg from sliding outwardly of its blind bore while permitting relative rotation between the leg and the drive member in which it is retained.

6. The angular drive adapter of claim 1 wherein said drive means includes a recess in the other end of said first drive member for engagement with a drive pin of a ratchet tool, and a drive pin on the other end of said second drive member for engagement with the drive recess of a socket.

7. The angular drive adapter of claim 1 wherein said drive means includes a recess in the other end of said first drive member for engagement with a drive pin of a ratchet tool, and a drive recess on the other end of said second drive member for engagement with a screwdriver insert.

8. The angular drive adapter of claim 6 wherein each of said recess and said drive pin has a generally square periphery.

9. The angular drive adapter of claim 7 wherein each of said recesses has a generally hexagonal periphery.

* * * * *